(12) United States Patent
Sorokin et al.

(10) Patent No.: US 9,959,400 B2
(45) Date of Patent: May 1, 2018

(54) CONTROLLING THE ACCESS TO A USER INTERFACE FOR ATMOSPHERE CONTROL WITH AN ATMOSPHERE CREATION SYSTEM

(75) Inventors: Mikhail Victorovich Sorokin, Eindhoven (NL); Willem Piet Van Hoof, Horst (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 614 days.

(21) Appl. No.: 13/805,082

(22) PCT Filed: Jun. 23, 2011

(86) PCT No.: PCT/IB2011/052760
§ 371 (c)(1),
(2), (4) Date: Dec. 18, 2012

(87) PCT Pub. No.: WO2011/161643
PCT Pub. Date: Dec. 29, 2011

(65) Prior Publication Data
US 2013/0096702 A1    Apr. 18, 2013

(30) Foreign Application Priority Data

Jun. 25, 2010 (EP) .................................... 10167352

(51) Int. Cl.
*G06F 21/34* (2013.01)
*H04L 12/24* (2006.01)
(Continued)

(52) U.S. Cl.
CPC ............. *G06F 21/34* (2013.01); *G05B 13/02* (2013.01); *G05B 15/02* (2013.01); *G05B 19/042* (2013.01);
(Continued)

(58) Field of Classification Search
CPC .. F24F 11/006; F24F 11/0009; F24F 11/0012; F24F 11/0015; F24F 2011/0063;
(Continued)

(56) References Cited

U.S. PATENT DOCUMENTS 6,431,444 B1    8/2002  Gatto
7,213,061 B1 *  5/2007  Hite .................... H04L 12/2803
                                                        361/803
(Continued)

FOREIGN PATENT DOCUMENTS

CN        1748218 A       3/2006
JP     2005158367 A       6/2005
(Continued)

OTHER PUBLICATIONS

Gail-Joon Ahn, Hongxin Hu, Jing Jin, "Security-Enhanced OSGi Service Environments", IEEE Transactions on Systems, Man, and Cybernetics-Part C: Applications and Reviews, vol. 39, No. 5, Sep. 2009, pp. 562-571.*
(Continued)

*Primary Examiner* — Crystal J Barnes-Bullock

(57) ABSTRACT

The invention relates to accessing user interfaces for atmosphere controlling, particularly to comfortably accessing dedicated user interfaces of a complex atmosphere control system. A basic idea of the invention is to provide several user interfaces, each of which is provided for a certain control configuration for atmosphere control with an atmosphere creation system and to control the access to the user interfaces. In an embodiment of the invention, a system for controlling the access to a user interface for atmosphere control with an atmosphere creation system (10), which is provided to create atmospheres in an environment, is provided, wherein the user interface access control system comprises—several user interfaces (12), wherein each use interface is provided for a certain control configuration for
(Continued)

atmosphere control with the atmosphere creation system, —several access control codes (14, 16), wherein each access control code is assigned to one of the several user interfaces, and —user interface access control means (18, 20) being adapted to receive an access control code and to access the user interface assigned to the received access control code.

11 Claims, 2 Drawing Sheets

(51) Int. Cl.
*G05B 15/02* (2006.01)
*G05B 19/042* (2006.01)
*H05B 37/02* (2006.01)
*G05B 13/02* (2006.01)
*F24F 11/00* (2018.01)

(52) U.S. Cl.
CPC ........... *H04L 41/22* (2013.01); *H05B 37/029* (2013.01); *F24F 2011/0068* (2013.01); *F24F 2011/0091* (2013.01)

(58) Field of Classification Search
CPC ...... F24F 2011/0068; F24F 2011/0091; H04L 12/2816; H04L 12/2827; H04L 12/2829; H04L 2012/285; H04L 41/22; G06F 21/31; G06F 21/34; G05D 23/1917; G05D 23/1927; G06Q 30/0257; G05B 15/02; Y02B 70/325; Y04S 30/14
See application file for complete search history.

(56) References Cited

U.S. PATENT DOCUMENTS

| | | | | |
|---|---|---|---|---|
| 7,224,366 B2* | 5/2007 | Kessler | ............... | G06F 3/04842 345/173 |
| 7,509,402 B2* | 3/2009 | Moorer | ............... | H04L 12/2814 455/419 |
| 8,160,752 B2* | 4/2012 | Weaver | ..................... | H02J 3/14 315/307 |
| 8,301,899 B2* | 10/2012 | Millar | ..................... | G06F 21/31 713/183 |
| 8,700,772 B2* | 4/2014 | Saint Clair | ............ | G05B 15/00 370/352 |
| 8,799,800 B2* | 8/2014 | Hood et al. | ................... | 715/771 |
| 8,892,261 B2* | 11/2014 | Hoonhout | ................. | A61L 9/12 700/275 |
| 9,118,656 B2* | 8/2015 | Ting | ..................... | H04L 63/0815 |
| 9,727,831 B2* | 8/2017 | Dunn | ..................... | G06Q 10/06 |
| 2004/0260427 A1* | 12/2004 | Wimsatt | ....................... | 700/275 |
| 2005/0185392 A1 | 8/2005 | Walter et al. | | |
| 2005/0275626 A1* | 12/2005 | Mueller | ............. | H05B 37/0245 345/156 |
| 2016/0147427 A1* | 5/2016 | Liverance | ........... | G06F 3/04847 715/743 |
| 2017/0124792 A1* | 5/2017 | Schoenfelder | .......... | G06F 21/31 |

FOREIGN PATENT DOCUMENTS

| | | |
|---|---|---|
| JP | 2006004025 A | 1/2006 |
| JP | 2006048487 A | 2/2006 |
| WO | 2008029323 A1 | 3/2008 |
| WO | 2008142644 A1 | 11/2008 |
| WO | 2008146245 A1 | 12/2008 |
| WO | 2009040202 A2 | 4/2009 |
| WO | 2009136243 A8 | 11/2009 |

OTHER PUBLICATIONS big.eu.org, various interfaces on consecutive pages from: BACnet Europe Journal, ISSN 1514-9572, Journal 8, Mar. 2008, pp. 48-55.*
JControls, Cisco, Building Automation System over IP (BAS/IP) Design and Automation, Johnson Controls, Buidling Efficiency and Cisco, Connected Real Estate Practice, Network and Information Technology Considerations Technical Bulletin, Aug. 2008, pp. 1-1 to 4-36.*
Wolfgang Kastner, Georg Neugschwandtner, Stefan Soucek, H. Michael Newman, "Communication Systems for Building Automation and Control", Proceedings of the IEEE, vol. 93, No. 6, Jun. 2005, pp. 1178-1203.*

\* cited by examiner

CONTROLLING THE ACCESS TO A USER INTERFACE FOR ATMOSPHERE CONTROL WITH AN ATMOSPHERE CREATION SYSTEM

TECHNICAL FIELD

The invention relates to controlling the access to a user interface for atmosphere control with an atmosphere creation system, for example a complex lighting system.

BACKGROUND ART

Atmosphere controlling with an atmosphere creation system comprises the setting of desired atmospheres in an environment, in which the atmosphere creation system is installed. An example of an atmosphere creation system is a complex lighting system with dozens of light units. In order to create a desired lighting atmosphere, the lighting system may allow to comprehensively control the lighting parameters such as intensity and color in different areas of an environment, in which the lighting system is installed. Atmosphere control is however not limited to lighting atmosphere control, but comprises also audio, video, scent control and even HVAC (Heating, Ventilation, Air Conditioning). In other words, atmosphere control as referred to herein comprises the technical control of everything, which is sensorial perceptible by creatures. WO2008/142644A1 discloses a system and method for the automatic creation of an atmosphere with an atmosphere creation system.

Creating desired atmospheres in environments is a topic, which becomes more and more interesting for retailers. An atmosphere may be for example related to the branding of a retailer, such as a certain color lighting created by a lighting system and a soundscape created by a sound system in a shop of the retailer. Especially, many branded retail chains are very particular about their brand image and, therefore, it might be of interest for them to keep it the same in all the stores in their retail chain. However, applying particularly branded atmospheres in shops nowadays is facing many challenges like complexity of the controller solutions (and reliability issues coming with it), not flexible and unfriendly user interfaces, large labor-intense installation and commissioning effort, a lot of effort for troubleshooting, difficult and labor intense scene creation process, high costs of atmosphere creation means such as luminaires as well as controls and user interfaces.

For example, having installed a flexible lighting system in a shop, users are often faced with an issue of expensive, not updatable and not customizable user interfaces for controlling the lighting system. Moreover, user interfaces are often not desired to be used by the shop personnel except for authorized persons in some cases. Remote controls for different areas in the store can get confused with each other, or misused by the personnel because there is no access control or simply get lost.

SUMMARY OF THE INVENTION

Therefore, it is an object of the invention to provide an improved atmosphere controlling with atmosphere creation systems.

The object is solved by the subject matter of the independent claims. Further embodiments are shown by the dependent claims.

A basic idea of the invention is to provide several user interfaces, each of which is provided for a certain control configuration for atmosphere control with an atmosphere creation system and to control the access to the user interfaces. Several user interfaces means also merely one user interface, which is provided for a certain control configuration. Thus, different persons may control the atmosphere creation in different ways, since their access to the control possibilities may be restricted depending on their position, level of experience, status and so on. For example, shop personnel may get only access to user interface with a highly restricted control configuration so that they can only select for example among different atmospheres or control the atmosphere creation only in certain areas of the environment, while technical personnel may have access to user interfaces with a lot more control possibilities of the atmosphere creation system. The access to a certain user interface may be technically implemented by an access control code.

An embodiment of the invention provides a system for controlling the access to a user interface for atmosphere control with an atmosphere creation system, which is provided to create atmospheres in an environment, wherein the user interface access control system comprises several user interfaces, wherein each use interface is provided for a certain control configuration for atmosphere control with the atmosphere creation system, several access control codes, wherein each access control code is assigned to one of the several user interfaces, and user interface access control means being adapted to receive an access control code and to access the user interface assigned to the received access control code.

Thus, a user may easily access a certain user interface for controlling the atmosphere creation by means of an access control code.

An access control code may contain an encoded network address assigned to a certain area of the environment, and the user interface access control means may comprise a receiver for receiving an access control code, a decoder for decoding a network address from an access control code, and a selector for selecting the user interface assigned to the access control code by using the decoded network address.

The system may further comprise a server for storing and providing user interfaces under the network address encoded in the access control code, wherein the server is adapted to dynamically create and provide a selected user interface after receiving of a request from the selector.

The access control code may further contain log-in data for accessing a secured user interface assigned to the access control code and stored on and provided by the server.

The system may further comprise a user interface provider for providing a user interface accessed by the access control means, wherein the user interface provider is further adapted to receive and process user inputs and to create control commands for the atmosphere creation system based on processed user inputs and to transmit the created control commands to the atmosphere creation system.

A control configuration of a user interface may comprise user selectable atmosphere settings and controls for creating and adjusting different atmospheres with the atmosphere creation system.

A control configuration may be updateable with new selectable atmosphere settings and controls for new atmospheres.

The system may further comprise a database containing user interfaces, control configurations, user selectable atmosphere settings and controls, and first assignments of the atmosphere settings and controls to control configurations and second assignments of the control configurations to user interfaces.

A further embodiment of the invention relates to an access control code carrier being adapted for usage with a system of the invention as specified above.

The carrier may be implemented by a sticker particularly stored in a document, a control-booklet, or an electronic document, or a mobile device, which stores an access control code.

A further embodiment of the invention relates to a mobile device being adapted to be used with a system of the invention and as specified above and being further adapted to provide a user interface accessed by user interface access control means, wherein the mobile device can be particularly adapted to store an access control code and to transmit the stored access control code to the user interface access control means.

A yet further embodiment of the invention relates to a method for controlling the access to a user interface for atmosphere control with an atmosphere creation system, which is provided to create atmospheres in an environment, comprising the acts of
  providing several user interfaces each provided for a certain control configuration for atmosphere control with the atmosphere creation system,
  receiving an access control code, which assigned to one of the provided user interfaces, and
  accessing the user interface assigned to the received access control code.

A further embodiment of the invention provides a computer programmed to perform a method according to the invention such as a PC (Personal Computer) and comprising an interface for controlling a atmosphere creation system.

Another embodiment of the invention provides a computer program enabling a processor to carry out the method according to the invention and as specified above.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
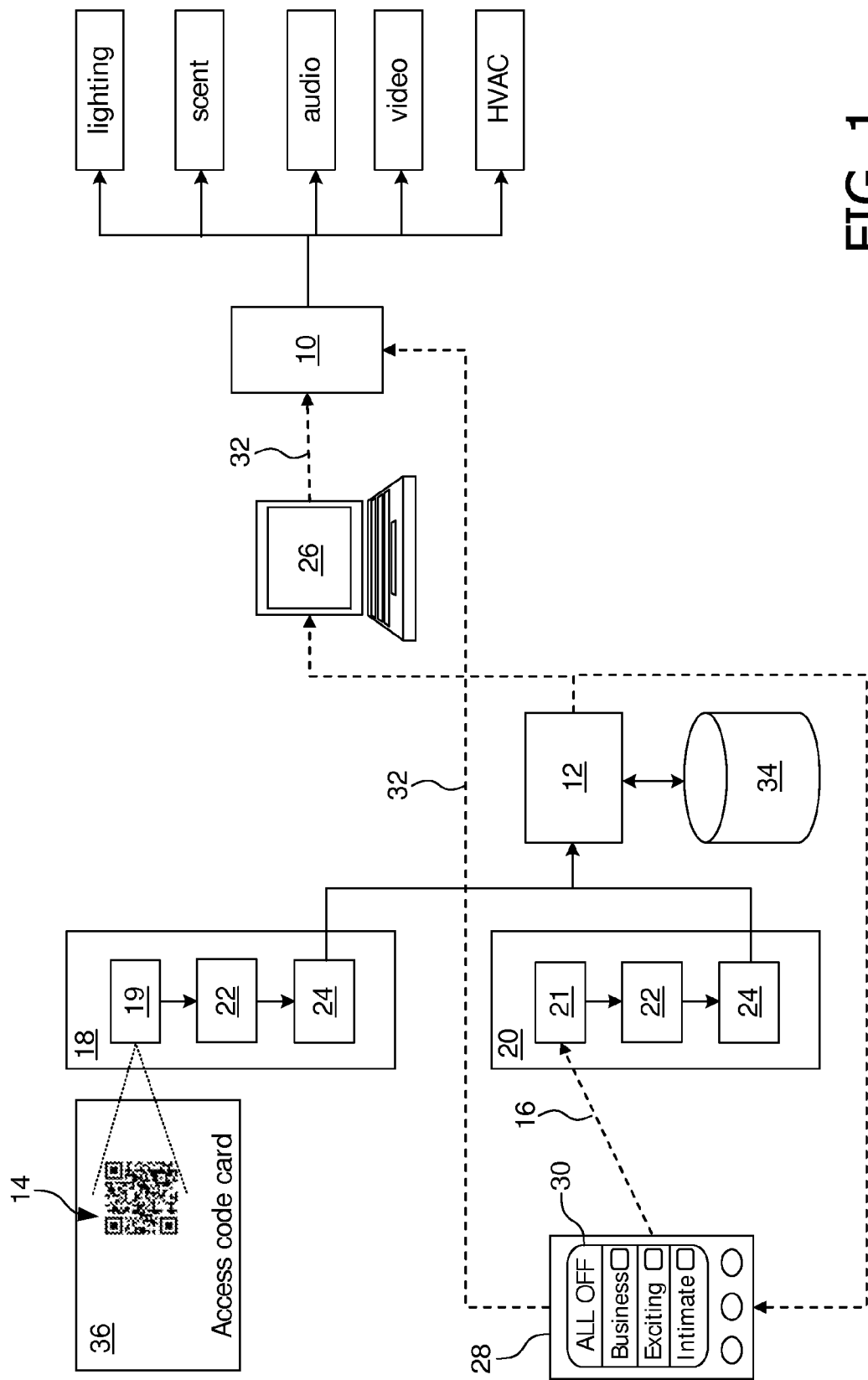
FIG. 1 shows an atmosphere creation system and an embodiment of a system for controlling the access to a user interface for atmosphere control with the atmosphere creation system according to the invention.

In the following, functionally similar or identical elements may have the same reference numerals.

FIG. 1 shows an atmosphere creation system 10, for example implemented by an atmosphere controller being adapted to control lighting, scent, audio, video, and HVAC in an environment, in which the atmosphere creation system 10 is installed. An example of an environment is a shop of a retail chain. The lighting may comprise a complex lighting system with dozens of lighting units, which are able to create color lighting. The lighting system may create a desired lighting scene under control of the atmosphere creation system 10. Scent may be generated by scents generators. Audio may be created by a sound system controlled by the atmosphere creation system 10. Video may be created by video displays in the shop, which display video scenes or pictures. Finally, the temperature and air condition may be controlled by a HVAC system installed in the shop and controlled by the atmosphere creation system 10. The atmosphere creation system 10 may be implemented by a computer, for example a PC or embedded computer, which is configured to execute the control tasks for creating a desired atmosphere. In order to accomplish these control tasks, the computer may execute dedicated software for processing atmosphere creation programs, which may be for example supplied by the headquarter of the retail chain. The programs may be for example downloaded from a server of the headquarter or remotely uploaded to the computer in the shop from the server. The programs may allow to some degree interactivity, i.e. adjusting or fine tuning of the atmospheres to be created. Furthermore, the atmosphere creation system 10 may also allow selecting and adjusting at least to some degree the programs for creating atmospheres by using provided user interfaces. The provision of the user interfaces will be described in the following in detail.

Several user interfaces may be provided in order to allow people with different skills, authorizations, technical backgrounds, business status in the retail chain and so on to control the atmospheres to be created with the atmosphere creation system 10. In order to make this as comfortable and usable for the people as possible, each user interface is provided for a certain control configuration for atmosphere control. This means that each user interface provides its own dedicated degree of controllability of the atmosphere creation offering more or less selectable atmosphere settings and controls for creating and adjusting different atmospheres. For example, a very simple user interface for shop personal with less skills in atmosphere control and nearly no technical background may comprise only some buttons for selecting different atmosphere, but no controls to adjust any selected atmosphere (such a simple user interface is shown on the screen of the mobile device 18 in FIG. 1, which will be explained later in detail). In contrast to this, a more complex user interface for skilled technicians may comprise several controls to fine tune and adjust the settings of an atmosphere, for example controls for adjusting the color, intensity and saturation of lighting in different areas of an environment. The provided user interfaces may be web-based, i.e. hosted by a web server and accessible via the internet. However, also other technologies may be applied to provide the user interfaces, such as technologies employing remote procedure calls.

The user interfaces are stored on a server 12, which is also configured to provide the user interfaces. The server 12 is accessible in a network, for example a TCP/IP-based network such as the internet or a LAN (Local Area Network). The server 12 is configured to dynamically create and provide a selected user interface upon a request. Dynamically creating the user interface means that a requested user interface is created after the receipt of the request. However, dynamically creating may also comprise static user interfaces, which may be for example stored on the server 12, and merely adapted to the requester. The server 12 has access to a database 34, which contains user interfaces, control configurations, user selectable atmosphere settings and controls, and first assignments of the atmosphere settings and controls to control configurations and second assignments of the control configurations to user interfaces. Thus, a control configuration comprises a subset of available selectable atmosphere settings and controls, and a user interface comprises one or even more control configurations. A control may be for example a basic user interface element for controlling one parameter of an atmosphere to be controlled, for example a slider for changing lighting intensity, or a selector for selecting an area of the environment, in which the atmosphere creation system is installed, or even a blinds' control. A selectable atmosphere setting may be for example a basic user interface element enabling the selection of a certain atmosphere setting, such as for example dimmed ambient lighting, calming background sound, sunset pictures, calming scents, warm climate.

Next, the access to user interfaces will be described in detail. A user interface is only provided to an authorized requester. An authorized requester is for example a user, who has the access privileges for accessing a desired user interface. Access is granted by means of an access control code, which may be assigned for example to a user or a status of a person such as technician, shop personnel, shop manager. An access control code can be implemented in several different ways. Two embodiments are shown in FIG. 1.

According to a first implementation, the access control code is implemented by means of a graphical code 14 printed on an access code card 36 as carrier for the access control code. In FIG. 1, a special implementation of the access control code as a graphical link 14 (for example on a small sticker) to a dedicated user interface for each location in an environment is shown. The graphical link 14 belongs to the access control code and is printed for example using a QR code on the card 36. The graphical link 14 will provide a necessary user interface to everyone who needs to control certain area. Security can be provided by access protection of the user interface web pages (for example by asking for login details), or protecting access to the network (for example by placing user interfaces on the local network and protecting access to it with a password) of access to the local wireless network.

According to a second implementation, the access control code is implemented in electronic form, for example as an electronic certificate, and stored in an electronic device, such as a mobile device 28 shown in FIG. 1. The mobile device 28 can be for example an electronic key, a smartphone, mobile phone, PDA (Personal Digital Assistant), a mobile PC such as a laptop or UMPC (Ultra Mobile PC) or tablet PC. The mobile device 28 may comprise a display 30 and serve also as user interface provide as explained later. When the mobile device 28 is a configurable computing device, the access control code may also be implemented by means of a dedicated software such as a small application (app) for accessing a user interface. This app may be for example downloadable from a webserver. The access control code may be also implemented as RFID (Radio Frequency Identification) tag or sticker, which may be for example contained in an access code card or sticked in a mobile phone, smartphone or PDA.

Each access control code in the system is assigned to one of several user interfaces stored on the server 12. Next, the accessing of a user interface assigned to an access control code and the providing of the accessed user interface is explained in detail.

The system comprises user interface access control means 18 and 20, which may be implemented as separate stations or integrated in for example network equipment or the server 12. Each means 18 and 20 comprises a receiver 19 and 21, respectively, for receiving an access control code 14 or 16, respectively. The receiver 19 is implemented by means of a camera, which takes a picture of the graphical code 14, while the receiver 21 is implemented as a RF receiver receiving the access control code 16 wirelessly transmitted from the mobile device 28. The RF receiver 21 may be for example adapted to employ a wireless communication technology for receiving access control codes such as a Bluetooth®, ZigBee™ or any kind of RFID technology. A received access control code, which contains an encoded network address of the server 12, is processed by a decoder 22 for decoding the network address. A selector 24 then selects a user interface assigned to the received access control code 14 or 16, respectively, by requesting from the server 12 using the decoded network address of the server 12 and further information regarding the user interface to be accessed. For example, the selector 24 may create a HTTP request with the decoded network address and a user interface ID code for contacting a webserver executed by the server 12. The server 12 may then as already described above dynamically create the requested user interface and provide it for access. The decoder 22 and the selector 24 may be implemented in software. The means 18 may be for example implemented in a device with a camera, for example a smartphone, PC such as a laptop or PDA with a camera applicable as receiver 19 and configured by dedicated software to implement the decoder 22 and selector 24.

The server 12 may provide an accessed user interface via a webserver executed on the server. The webserver may transmit the user interface to either a dedicated user interface provider, for example a computer 26 with network access. The user interface may be also provided directly to the access requester, for example to the mobile device 28, which transmitted the access control code 16 to the user interface control means 20. The graphical part of the user interface may be represented on the display of the computer 26 serving as user interface provider or the display 30 of the mobile device 28, as shown in FIG. 1.

A user interface provider, the mobile device 28 or the computer 26, is further provided to receive and process user inputs, such as a selection of a desired atmosphere or a control command to adjust an existing atmosphere. In FIG. 1, the graphical part of a user interface as represented on the display 30 of the mobile device 28 is an example of a simple user interface for a non technically skilled person, such as shop personnel. This shown user interface allows a person to select among three different atmospheres "Business", "Exciting", "Intimate", or to deactivate atmosphere creation with "ALL OFF". The display may be a touch screen allowing a person to make a selection by simply touching the desired atmosphere. When a user input such as a selection of an atmosphere to be created is received by the user interface provider, the user interface software processes the received input by creating a corresponding control command 32, for example by creating a command like "create business/exciting/intimate atmosphere". The so created control command 32 is then transmitted from the user interface provider 26 or 28, respectively, to the atmosphere creation system 10, particularly to its central controller. A control command is typically an abstract level command, which means that it is not related to a specific technical infrastructure of the atmosphere creation system. Thus, the central controller of the atmosphere creation system 10 processes the received control command 32 by transferring the command to the technical infrastructure of the atmosphere creation system, i.e. by controlling lamps of the lighting, scent generators, an audio and video system, and an HVAC system in order to create the desired atmosphere. It should be noted that the entire communication in the system, such as the communication between the user interface access control means 18 and 20 and the server and the communication between the mobile device 28 and the computer 26, respectively, and the atmosphere creation system 10 may be performed by using a wireless network, for example by employing existing RF communication technologies like WLAN (Wireless Local Area Network) or mobile communication technology. For example, the server 12 as well as the user interface access control means 18 and 20 may be members of a WLAN network, installed in a shop. The user interface access control means 20 may also be accessible via the internet, and the mobile device may communicate with the means 28 over a mobile communication (e.g. 3G or other protocol) data connection. This makes remote access possible, for example outside a store. In a controlled area or environment, for example a large store with several different areas, in which different atmospheres can be created with an atmosphere creation system, several wireless networks may be available for controlling the atmosphere creation and access to user interfaces for these different areas. Then, it may be helpful to use clear names for the different networks, which indicate the functionality of control networks, for example "Atmosphere Control", "Climate Control", "Store Control". Access to each of the networks may be password protected.

Figure 2:
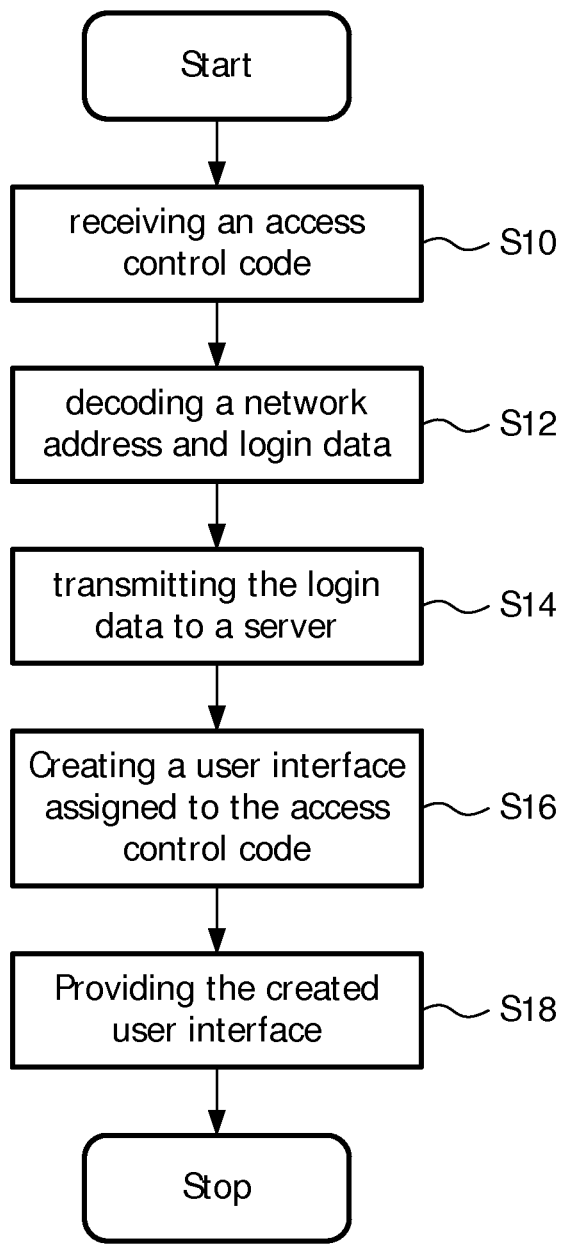
FIG. 2 shows an embodiment of a method for controlling the access to a user interface for atmosphere control with an atmosphere creation system according to the invention.

FIG. 2 shows a flowchart of a method for controlling the access to a user interface for atmosphere control with an atmosphere creation system. The shown flowchart may be part of a software package for controlling the creation of atmospheres with an atmosphere creation system. This software package may be for example installed on a computer such as a PC, smartphone, or PDA comprising a receiver for receiving access control codes, for example a camera. Control of the atmosphere creation may be handled via an interface provided for communication with an atmosphere creation system, particularly for controlling the atmosphere creation system. The interface may a wireless interface, and particularly based on a wireless technology standard such as WLAN or Bluetooth® or ZigBee™.

For controlling atmosphere creation, a user may for example hold an access control card with an access control code before the camera of the computer. The software package executed by the computer receives the access control code as a picture of the graphical code printed on the access control card taken with the camera (step S10 in FIG. 2). A decoding module of the software then decodes a network address and login data from the graphical code (step S12). A selecting module of the software transmits the login data to a server with the decoded network address (step S14). The server then creates an user interface assigned to the login data (step S16) and provides the created user interface (step S18), for example by transmitting it to the computer, which may display the user interface and handle further inputs from the user, or to a dedicated user interface provider such as a terminal for controlling the atmosphere creation with the atmosphere creation system.

The invention may particularly apply for area management with an atmosphere creation system (for example atmosphere management (programs for lighting, audio, video, scent), air conditioning and security). Examples of the areas are whole shops, areas in shops (like fitting rooms), meeting rooms, areas in hotels and restaurants.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A user interface access control system for controlling access to a plurality of user interfaces for atmosphere control with an atmosphere creation system including a lighting system, which is provided to create atmospheres in an environment, wherein the user interface access control system comprises:
   data defining the plurality of user interfaces;
   a plurality of access control codes, wherein each access control code of the plurality of access control codes is assigned to a respective one of the plurality of user interfaces; and
   a user interface access control element being adapted to, for each user interface of said plurality of user interfaces, receive a corresponding access control code of the plurality of access control codes and to access the user interface assigned to the corresponding access control code, wherein each user interface of the plurality of user interfaces is adapted to provide a dedicated degree of controllability of the lighting system, offering in each user interface of the plurality of user interfaces a different amount of selectable atmosphere settings and controls for creating and adjusting a lighting effect generated by the lighting system in the environment,
   wherein the plurality of user interfaces include at least a first user interface containing controls for selecting different atmospheres for the environment and a first degree of controls for adjusting a selected atmosphere of the environment, and a second user interface containing controls for selecting different atmospheres for the environment and a second degree, different from the first degree, of controls for adjusting a selected atmosphere of the environment.

2. The user interface access control system of claim 1, wherein
   each access control code of the plurality of access control codes contains a respective encoded network address assigned to a respective area of the environment, and the user interface access control element comprises
   a receiver for receiving a given access control code of the plurality of access control codes,
   a decoder for decoding the network address from the given access control code, and
   a selector for selecting the user interface assigned to the given access control code by using the decoded network address.

3. The user interface access control system of claim 2, further comprising
   a server for storing and providing the plurality of user interfaces under the network addresses encoded in the plurality of access control codes, wherein the server is adapted to dynamically create and provide the selected user interface after receiving a request from the selector.

4. The user interface access control system of claim 3, wherein the given access control code further comprises log-in data for accessing the user interface assigned to the given access control code and stored on, secured by and provided by the server.

5. The user interface access control system of claim 3, further comprising
a user interface provider for providing any of the plurality of user interfaces accessed by the user interface access control element, wherein the user interface provider is further adapted to receive and process user inputs and to create control commands for the atmosphere creation system based on the processed user inputs and to transmit the created control commands to the atmosphere creation system.

6. The user interface access control system of claim 3, wherein
a control configuration of each user interface of the plurality of user interfaces comprises the corresponding selectable atmosphere settings and controls of the respective user interface.

7. The user interface access control system of claim 6, wherein the control configuration of each user interface of the plurality of user interfaces is updateable with new selectable atmosphere settings and controls for new atmospheres.

8. The user interface access control system of claim 6, further comprising
a database containing the data defining the plurality of user interfaces, each of the control configurations, each of the selectable atmosphere settings and controls, and first assignments of the atmosphere settings and controls to the control configurations and second assignments of the control configurations to the respective user interfaces.

9. The user interface access control system of claim 1, wherein the user interface access control element is adapted to, for each user interface of said plurality of user interfaces, dynamically create the user interface assigned to the corresponding access control code in response to receiving the corresponding access control code.

10. A method for controlling access to a plurality of user interfaces for atmosphere control with an atmosphere creation system including a lighting system, which is provided to create atmospheres in an environment, comprising:
providing data defining a plurality of user interfaces, each user interface of the plurality of user interfaces being adapted to provide a dedicated degree of controllability of the lighting system, offering in each user interface of the plurality of user interfaces a different amount of selectable atmosphere settings and controls for creating and adjusting a lighting effect generated by the lighting system in the environment, wherein the plurality of user interfaces include at least a first user interface containing controls for selecting different atmospheres for the environment and a first degree of controls for adjusting a selected atmosphere of the environment, and a second user interface containing controls for selecting different atmospheres for the environment and a second degree, different from the first degree, of controls for adjusting a selected atmosphere of the environment;
receiving an access control code, which is assigned to one of the provided user interfaces, and
accessing the user interface assigned to the received access control code.

11. The method of claim 10, further comprising dynamically creating the user interface assigned to the access control code in response to receiving the access control code.

\* \* \* \* \*